No. 609,567. Patented Aug. 23, 1898.
J. YERKES.
DOWEL HOLE BORING MACHINE.
(Application filed July 12, 1897. Renewed July 25, 1898.)
(No Model.) 4 Sheets—Sheet 1.
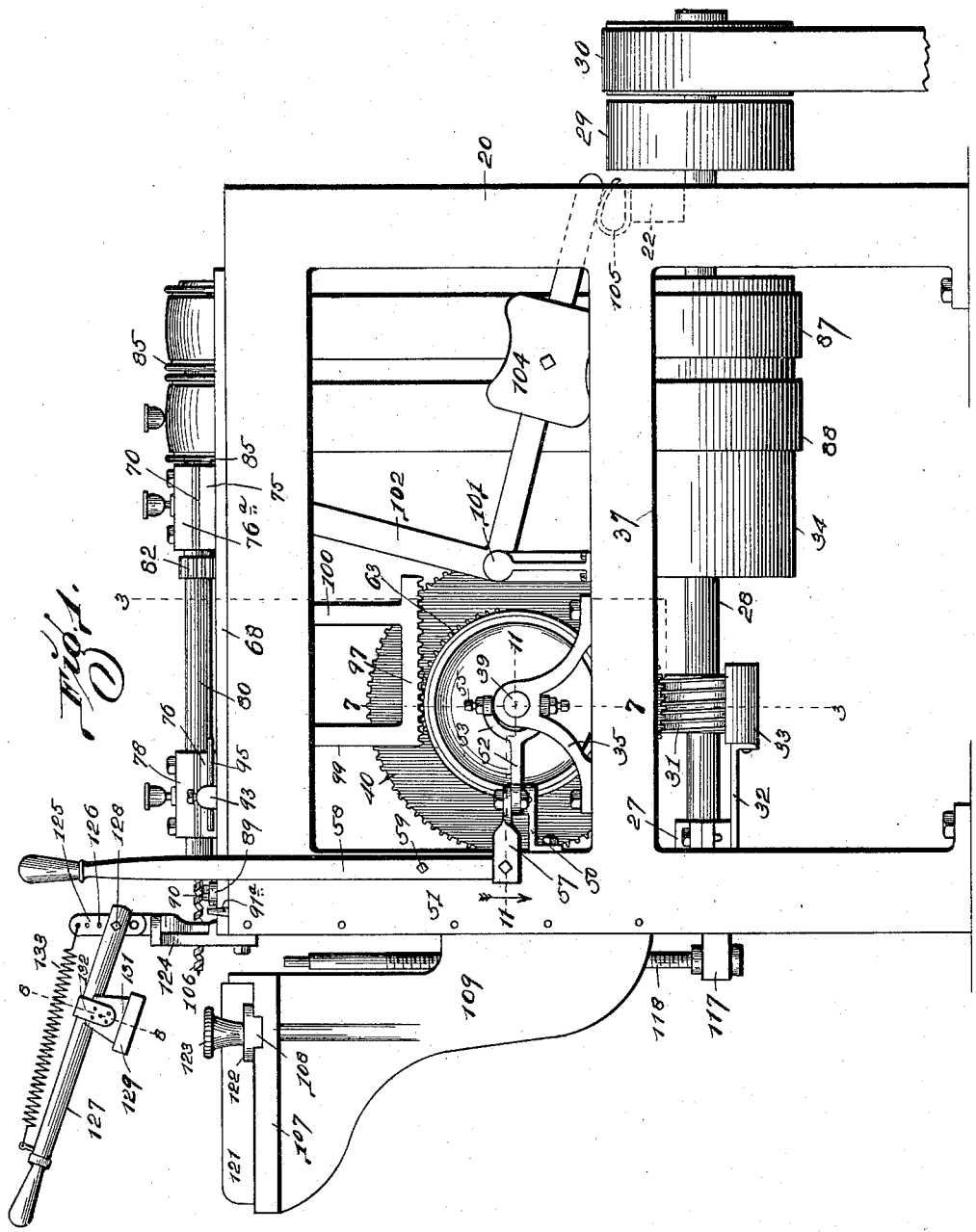

No. 609,567. Patented Aug. 23, 1898.
J. YERKES.
DOWEL HOLE BORING MACHINE.
(Application filed July 12, 1897. Renewed July 25, 1898.)
(No Model.) 4 Sheets—Sheet 2.
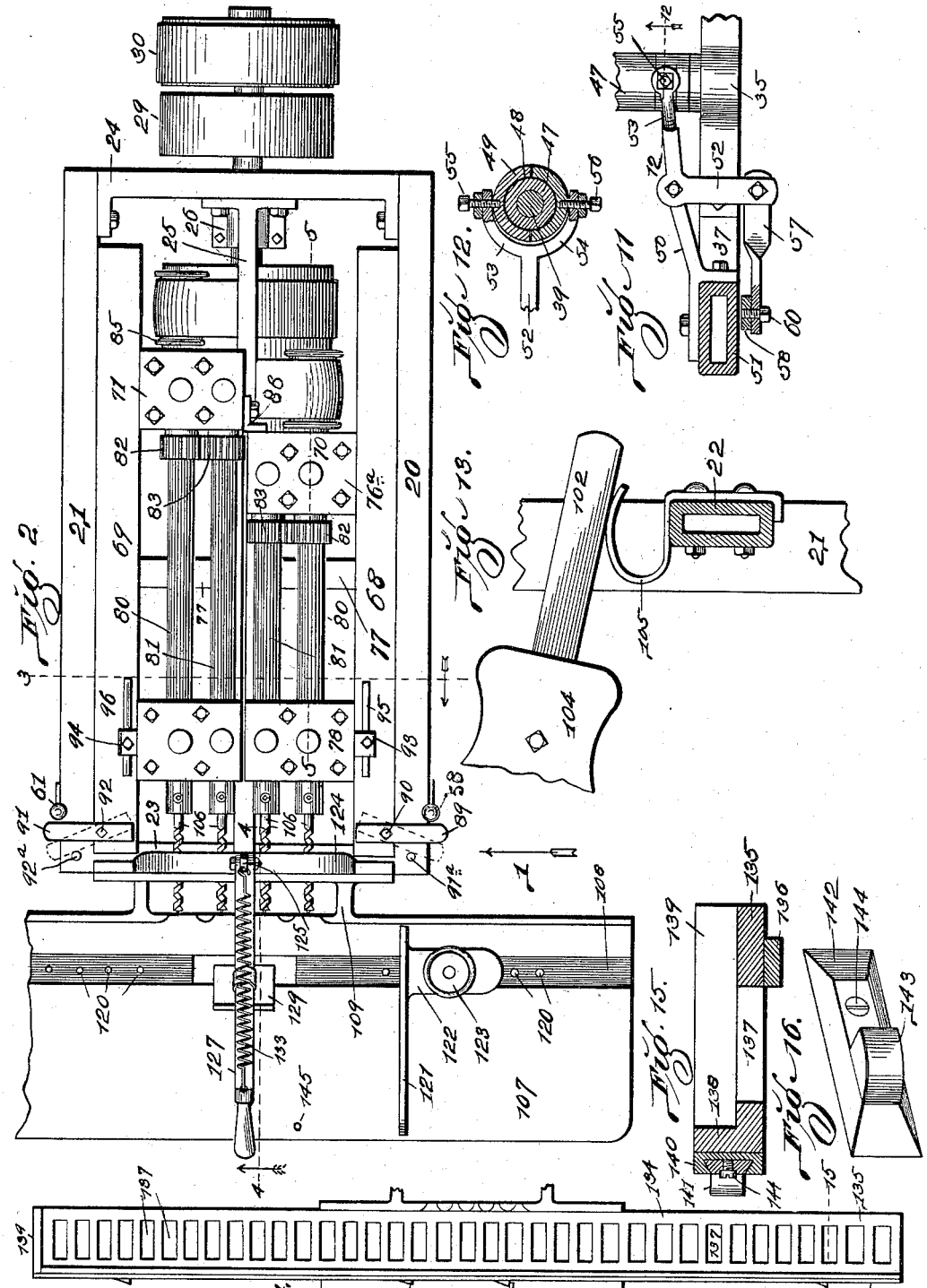

No. 609,567. Patented Aug. 23, 1898.
J. YERKES.
DOWEL HOLE BORING MACHINE.
(Application filed July 12, 1897. Renewed July 25, 1898.)
(No Model.) 4 Sheets—Sheet 3.
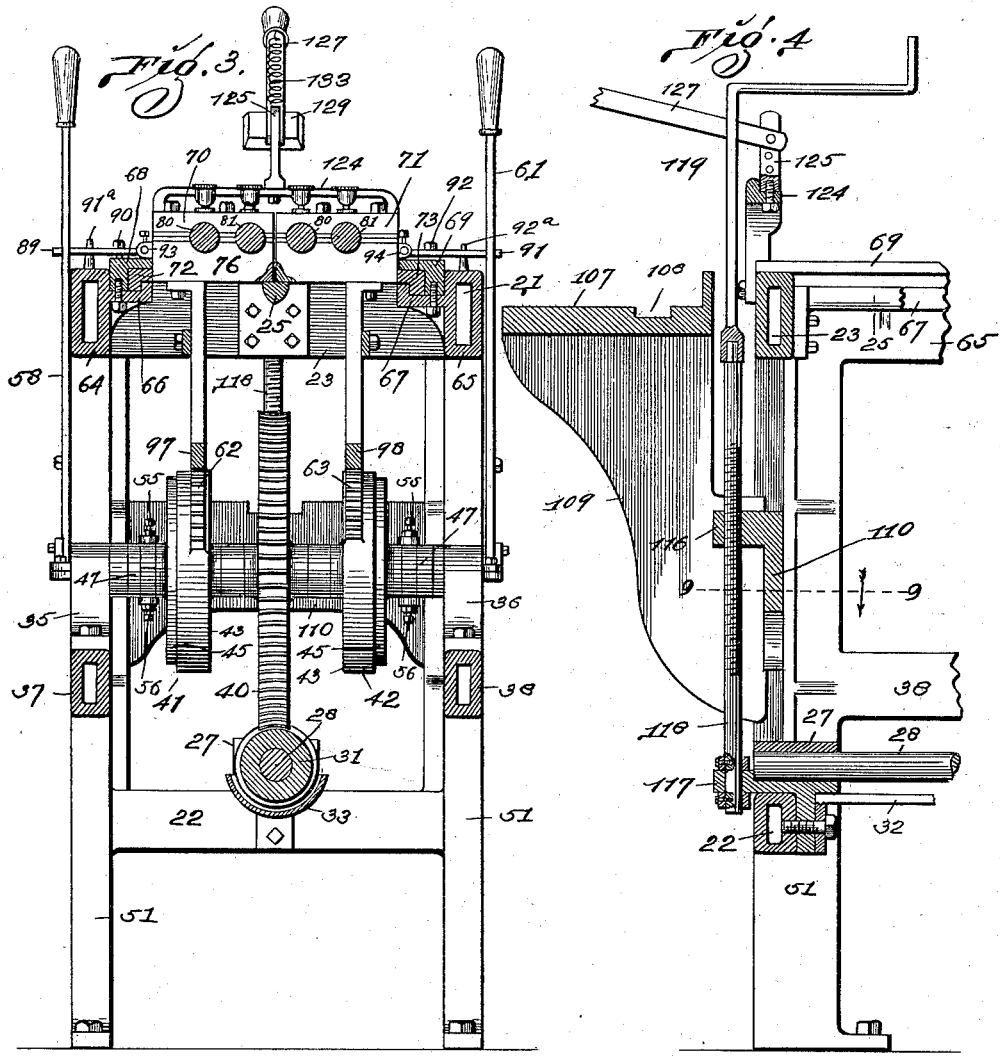

No. 609,567. Patented Aug. 23, 1898.
J. YERKES.
DOWEL HOLE BORING MACHINE.
(Application filed July 12, 1897. Renewed July 25, 1898.)
(No Model.) 4 Sheets—Sheet 4.
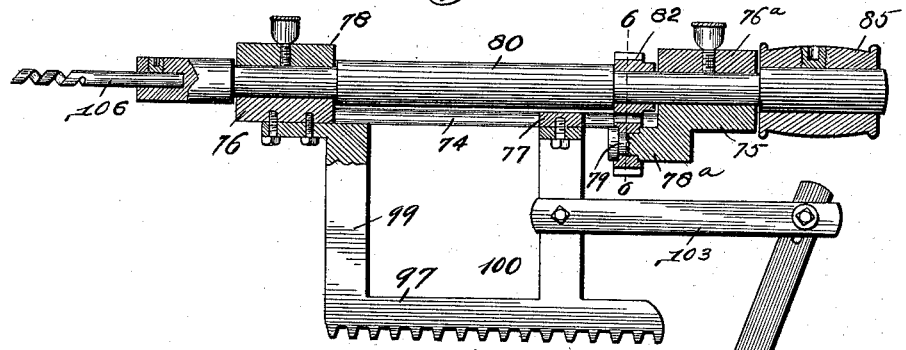
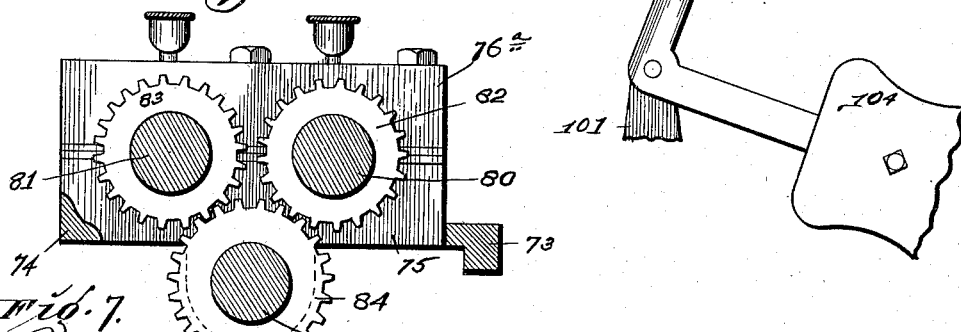
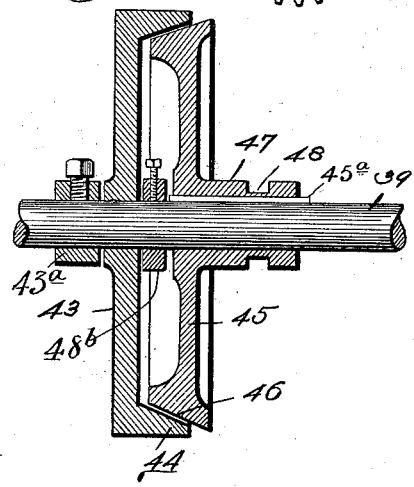
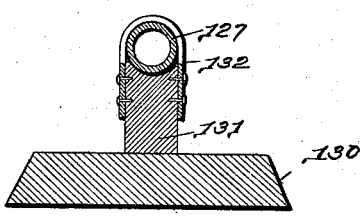
Attest
M. T. Smith,
A. J. McCauley
Inventor:
John Yerkes.
By Higdon, Longan & Higdon atty's.

UNITED STATES PATENT OFFICE.

JOHN YERKES, OF ST. LOUIS, MISSOURI.

DOWEL-HOLE-BORING MACHINE.

SPECIFICATION forming part of Letters Patent No. 609,567, dated August 23, 1898.

Application filed July 12, 1897. Renewed July 25, 1898. Serial No. 686,843. (No model.)

*To all whom it may concern:*

Be it known that I, JOHN YERKES, of the city of St. Louis, State of Missouri, have invented certain new and useful Improvements in Dowel-Hole-Boring Machines, of which the following is a full, clear, and exact description, reference being had to the accompanying drawings, forming a part thereof.

My invention relates to dowel-hole-boring machines; and it consists of the novel construction, combination, and arrangement of parts hereinafter shown, described, and claimed.

Figure 1 is a side elevation of the machine as seen looking in the direction indicated by the arrow 1 in Fig. 2. Fig. 2 is a top plan view, parts being broken away to economize space. Fig. 3 is a vertical cross-section taken approximately on the line 3 3 of Figs. 1 and 2. Fig. 4 is a longitudinal vertical section taken approximately on the line 4 4 of Fig. 2. Fig. 5 is a vertical longitudinal section taken approximately on the line 5 5 of Fig. 2. Fig. 6 is a vertical cross-section taken approximately on the line 6 6 of Fig. 5. Fig. 7 is a detail section of one of the friction-clutches, taken approximately on the line 7 7 of Fig. 1. Fig. 8 is a cross-section through the work-holder and taken approximately on the line 8 8 of Fig. 1. Fig. 9 is a horizontal sectional detail showing the sliding connection between the work-bench and the main frame and taken approximately on the line 9 9 of Fig. 4. Fig. 10 is a view in perspective of the lower half of one of the sliding carriages. Fig. 11 is a horizontal section taken approximately on the line 11 11 of Fig. 1. Fig. 12 is a cross-section taken approximately on the line 12 12 of Fig. 11. Fig. 13 is a sectional detail showing one of the buffers, parts being broken away to economize space. Fig. 14 is a plan view of the sliding gage or table used upon the work-bench. Fig. 15 is a cross-section taken approximately on the line 15 15 of Fig. 14. Fig. 16 is a view in perspective of one of the adjustable stops employed in the sliding gage.

Referring by numerals to the drawings, the side pieces 20 and 21 are connected by the lower cross-pieces 22 and the upper cross-pieces 23 and 24. The upper cross-pieces 23 and 24 are connected by means of the bar 25, arranged parallel with the side bars 20 and 21 and half-way between the side bars. A bearing 26 is attached to the rear lower cross-piece 22, and a similar bearing 27 is attached to the forward lower cross-piece 22, said bearings 26 and 27 being in longitudinal and horizontal alinement and approximately half-way between the side pieces 20 and 21. A driving-shaft 28 is mounted in said bearings 26 and 27, and the loose pulley 29 and the tight pulley 30 are mounted upon the rear end of said shaft immediately behind the lower rear cross-piece 22. A worm 31 is fixed upon the shaft 28 near its forward end. An arm 32 extends backwardly from the bearing 27 under the shaft 28, and an oil-cup 33 is carried by the rear end of said arm, the worm 31 operating in said oil-cup. A belt-wheel drum 34 is fixed upon the shaft 28 and extends from immediately in front of the rear lower cross-bar 22 approximately half-way to the front cross-bar 22. The bearings 35 and 36 are mounted in transverse horizontal alinement on the lower bars 37 and 38 of the side pieces 20 and 21 and near the forward ends of said bars. A shaft 39 is mounted in said bearings 35 and 36. A worm-gear 40 is fixed upon the central portion of said shaft 39 and meshes with the worm 31. The friction-clutches 41 and 42 are mounted upon opposite sides of the worm-gear 40 upon the shaft 39. The friction-clutches 41 and 42 are substantially alike, except that they work in opposite directions, and each consists of the wheel 43, loosely mounted upon the shaft 39, between the set-collars $43^a$ and $43^b$, and having the internal beveled flange 44, and a wheel 45, mounted upon the shaft 39 to slide endwise and held to rotate with the shaft by means of the spline $45^a$ and having the exteriorly-beveled face 46 engaging within the internal beveled flange 44, as required to form a frictional connection between the wheels 43 and 45. A collar 47 projects from the opposite side of the wheel 45 from the wheel 43, and an annular recess 48 is formed in said collar. The horizontally-divided ring 49 fits within the recess 48. An arm 50 projects backwardly from the post 51 of the side piece 20 and a short distance above the bar 37. A bell-crank lever 52 is pivotally attached to the rear end of the arm 50, the rear inner end of said bell-crank lever being divided to form the arms 53 and 54, said arms extending, respectively, above and below the ring 49. The set-screw 55 is inserted through the end of the arm 53, with its point operating in a recess in the upper half of the ring 49, and a similar set-screw 56 is inserted through the end of the arm 54, with its point operating in the recess in the lower half of the ring 49, as required to form a pivotal connection between the bell-crank lever and the ring. A link 57 is attached to the outer end of the bell-crank lever 52 and extends forwardly outside of the side piece 20. A hand-lever 58 is pivotally connected to the post 51 of the side piece 20 by means of the bolt 59, and the lower end of said hand-lever is connected to the forward end of the link 57 by means of the bolt 60. By operating the hand-lever 58 the wheel 45 is operated upon the shaft 39 to or from the wheel 43, thus operating the friction-clutch 40. The hand-lever 61 is mounted upon the opposite side of the machine from the hand-lever 58 and is connected to the friction-clutch 42 in the same manner as the lever 58 is connected to the friction-clutch 40. Segmental gears 62 and 63 are formed upon the peripheries of the flange 44 of the friction-clutches 41 and 42, respectively.

Extending inwardly from the upper bars 64 and 65 of the side pieces 20 and 21 are the L-shaped flanges 66 and 67, respectively, the inner ends of said flanges turning upwardly, thus forming, in conjunction with the side-bars 64 and 65, the horizontal channels open at their tops. The L-shaped bars 68 and 69 are inverted and placed in said channels and secured in position by means of lag-screws. The inner edges of the bars 68 and 69 are in vertical alinement with the inner edges of the flanges 66 and 67, respectively, and L-shaped slots are formed between said flanges and said bars.

The sliding carriages 70 and 71 are placed side by side, their inner corners resting upon the bar 25 and their outer side faces engaging the inner edges of the bars 68 and 69, respectively. The L-shaped lugs 72 and 73 extend from the outer lower corners of the carriages 70 and 71, respectively, into said L-shaped slots, thus forming sliding connections between the carriages and the frame of the machine. The sliding carriages 70 and 71 are substantially alike, except that they are constructed in rights and lefts and the left-hand carriage 71 is somewhat longer than the other carriage. The lower half of the carriage-frame 70 is shown in perspective in Fig. 10 and is rectangular and consists of the L-shaped lug 72, forming one side bar, the triangular bar 74, forming the opposite side, the bearing-blocks 75 and 76, connecting the ends of said side pieces, and the cross-bar 77, connecting the central portions of said side pieces. The bearing-blocks 75 and 76 are constructed to carry two shafts side by side and form the lower half of the bearings for said shafts. The bearing-block 76$^a$ is attached to the block 75 and forms the upper half of the bearing, and the bearing-block 78 is attached to the block 76. The side bar 74 slides upon the bar 25.

Extending downwardly and forwardly from the central portion of the bearing-block 75 of each of the carriages is an arm 78$^a$, the forward end of said arm being turned to form the trunnion 79.

A pair of shafts 80 and 81 is mounted in the bearings in each of the carriages, and spur-gears 82 and 83 are placed upon said shafts immediately in front of the rear bearings. A spur-gear 84 is fixed upon the trunnion 79 and meshes with the gears 82 and 83. The shafts 80 each extend backwardly beyond their bearings, and flanged belt-wheels 85 are fixed upon their rear ends. The rear bearing of the carriage 71 is located in a transverse line immediately behind the rear bearing of the carriage 70, and an angle-bar 86 is attached to the front corner and inner face of said bearing of the carriage 71 and projects inwardly and engages the rear face of the bearing of the carriage 70. The front bearings of the carriages are in transverse alinement. The carriage 70 may be operated independently; but the carriage 71 cannot be operated independently without removing the angle-bar 86. In other words, when the carriage 71 is operated the carriage 70 is operated simultaneously. The pulleys 85 are connected to the belt-wheel drum 34 by means of the belts 87 and 88. A lever 89 is pivotally mounted in a horizontal transverse position by means of the bolt 90, inserted downwardly through said lever into the forward end of the bar 68, the outer end of said lever being in front of and to be engaged by the hand-lever 58. A lever 91 is mounted in a horizontal transverse position and pivotally attached to the forward end of the bar 69 by means of the bolt 92, the outer end of said lever being positioned in front of and to be operated by the hand-lever 61. Pins 91$^a$ and 92$^a$ are inserted in the side pieces 20 and 21 to limit the forward motion of the outer ends of the levers 89 and 91. Ears 93 and 94 extend horizontally outwardly from the bearing-blocks 76 of each of the carriages. The pins 95 and 96 are inserted horizontally through said ears 93 and 94, respectively, and are adjusted in longitudinal directions by means of set-screws, the forward ends of said pins 95 and 96 being in position to engage the inner ends of the levers 89 and 91, respectively. The racks 97 and 98 are mounted in horizontal longitudinally extending positions in engagement with the segmental gears 62 and 63. Arms 88 extend upwardly from the forward ends of each of the racks and are attached to the bottoms of the bearing-blocks 76. Arms 100 extend upwardly from near the rear ends of each of the racks and are attached to the cross-bars 77 of the sliding carriages.

Brackets 101 extend upwardly from the central portions of the bars 37 and 38 of the side pieces 20, and bell-crank levers 102 are pivotally attached to the upper ends of said brackets, one arm of each of said levers extending upwardly and the other arm extending backwardly. The upper ends of the bell-crank levers 102 are attached to the arms 100 by means of the links or connecting-rods 103, and the weights 104 are attached to the lower ends of the levers 102. Leaf-springs 105 are attached to the rear lower cross-bar 22, the free ends of said springs engaging under the extreme lower ends of the bell-crank levers 102, as required to form buffers to relieve the shocks caused by the falling of the weights 104. Sockets are formed in the forward ends of the shafts 80 and 81 to receive and hold the boring-bits 106.

The work-bench 107 consists of a plate mounted in a horizontal position in front of the machine and having a recess 108 extending in a line transversely of the machine. The work-bench is supported by two brackets 109, slidingly connected to the frame for up-and-down adjustment. The lower ends of the brackets 109 are attached to or formed integral with the vertical plate 110, the side edges of said plate being turned slightly backward and chamfered, forming the faces 111 and 112. Flanges 113 project inwardly from the post 51 of each of the side pieces 20 and 21, as shown in Fig. 9, and the face 111 of the plate 110 is placed against the front side of said flanges 113. A triangular bar 114 is placed with one of its faces against the inner face of the post 51 and another of its faces against the face 112 of the plate 110, and said bar is held in position by means of screws 115, thus forming a sliding connection between the work-bench and the frame. An ear 116 projects forwardly from the upper edge of the plate 110. An ear 117 extends forwardly from the bar 27 in vertical alinement with ear 116, and vertically-alined apertures are formed through said ears 116 and 117, the aperture in the ear 116 being screw-threaded. The screw 118 is inserted through the ear 116 and through the ear 117. Collars are fixed upon the screw 118 above and below the ear 117 to hold the screw from vertical movement. A wrench 119 removably engages the upper end of the screw 118, as required to rotate the screw, and when the screw is rotated the work-bench 107 is adjusted up or down. Screw-threaded apertures 120 are formed through the work-bench in the center of the recess 108.

The gage-plate 121 is formed integral with the block 122, and said block is slidingly mounted in the recess 108 and adjustably held in position by means of the set-screw 123, rotatably inserted through said block and screw-seated in one of the apertures 120. A bow-shaped bracket 124 has its ends attached to the upper forward corners of the side pieces 20 and 21, said bracket extending upwardly over the boring-bits. An arm 125 extends upwardly from the central portion of the bracket 124, said arm having a series of apertures 126 formed in a line transversely of the machine. The hand-lever 127 is pivotally and adjustably attached to the arm 125 by means of the bolt 128.

The work-holder 129 is slidingly mounted upon the lever 127. The work-holder 129 is constructed as shown in Fig. 8 and consists of the block 130, the post 131 extending upwardly from the center of said block and having a curved recess in its upper end, the lever 127 being circular in cross-section and fitting in said recess, and a clip 132 encircles the lever 127 and has its ends attached to the post 131. A retractile coil-spring 133 is attached to the free end of the lever 127 and to the upper end of the arm 125, as required to hold the work-holder normally elevated. The gage 121 may be removed from the work-bench and the sliding gage 134 substituted.

The sliding gage consists of the plate 135, having a bar 136 attached to its lower face, said bar 136 operating within the recess 108. Openings 137 are formed through the plate 135 to reduce its weight. A flange 138 projects upwardly from the forward edge of the plate, thus forming a front stop, and a flange 139 projects upwardly from the left-hand end of the plate, thus forming an end stop. The work rests against the flanges 138 and 139 and upon the plate 135. The plate 140 is attached to the front face of the flange 138 and has a dovetailed slot formed in its front face and extending from end to end. The gage-stops 141 are adjustably mounted in said dovetailed slots. The gage-stops are constructed as shown in Fig. 16, and each consists of a block 142, slidingly mounted in the plate 140, and the lug 143, projecting outwardly from said block, said lug being triangular in plan and its front left-hand face being inclined relative to the plate 140 and its right-hand face being at right angles to said plate 140. A set-screw 144 is inserted through the block 142 and screw-seated in position, its point engaging the bottom of the dovetailed slot in which the block operates. When the set-screw 144 is loosened, the block will slide to any desired position, and then the set-screw is tightened, thus holding the stop in position relative to the gage. A vertical screw-threaded opening 144 is formed through the work-bench 107 near the center of its forward edge. A block 146 is placed in position upon the work-bench, and a screw 147 is inserted through said block in said opening 145. A leaf-spring 148 is attached to the block 146 and extends horizontally in a line transversely of the machine, the free end of said spring being bent into a line longitudinally of the machine and in position to engage the stops 141. A handle 149 is attached to the free end of the spring as a means of disengaging the spring from the stop.

When the driving-belt is upon the tight pulley and the shaft 28, the bits 106 will run continuously all in the same direction; but the remainder of the machine remains inactive. The operator places the work upon the bench 107, engages the hand-lever 127 to depress the work-holder 129 into engagement with the work, as required to hold it in position upon the bench. Then with the other hand the operator engages the lever 58 and pulls the upper end forwardly, thus operating the friction-clutch 41, and the segment 62, engaging the rack 97, slides the carriage 70 forwardly, bringing the bits into the work. The depth to which the bits will penetrate the work is regulated by adjusting the pin 95 through the ear 93. If the operator desires to bore more than two holes, he will operate the lever 61 instead of the lever 58. When the forward ends of the pins 95 and 96 engage the levers 89 or 91, the hand-levers 58 and 61 are thrown backwardly, thus releasing the friction-clutches, and the weights 104 operate to slide the carriages back to their normal positions. When the sliding gage 134 is used, the stops 141 are first adjusted as required for the work. The spring 148 is held out of engagement with said stops 141 and the gage is moved to the right. Then as the boring progresses the gage is moved to the left.

I claim—

1. In a dowel-hole-boring machine, two tool-carriages slidingly mounted side by side, a lever-operated connection between one of said carriages and the driving-shaft whereby said carriage is operated independently, a lever-operated connection between the second one of said carriages and the driving-shaft whereby said second carriage is operated, and a connection between said carriages whereby the first-mentioned carriage is operated by the operation of the second-mentioned carriage, substantially as specified.

2. In a dowel-hole-boring machine, two tool-carriages slidingly mounted side by side, a projection upon one carriage engaging the other carriage as required to operate the second-mentioned carriage by the operation of the first-mentioned carriage and as required to allow the second-mentioned carriage to operate independently, connections between both or each of said tool-carriages and the driving-shaft for operating said carriages, adjustable stop mechanism regulating the strokes of said carriages, and means of returning said carriages to their normal positions after they have been advanced to the work, substantially as specified.

3. In a dowel-hole-boring machine, a driving-shaft, tool-holding carriages mounted to slide in a plane parallel with the driving-shaft, a second shaft mounted transversely of the driving-shaft, a worm upon the driving-shaft, a worm-gear upon the second shaft engaging said worm, friction-clutches upon said second shaft, levers operating said friction-clutches, a rack-and-gear connection between said friction-clutches and said sliding carriages whereby said carriages are advanced to the work by the operation of said clutches, a projection upon one of said sliding carriages and engaging the other one of said sliding carriages whereby the second carriage is operated by the operation of the first carriage and whereby the second carriage is allowed to operate independently of the first carriage, substantially as specified.

4. In a dowel-hole-boring machine, a driving-shaft, a tool-holding carriage mounted to slide in a plane parallel with the driving-shaft, a second shaft mounted transversely of the driving-shaft, a worm upon the driving-shaft, a worm-gear upon the second shaft engaging said worm, a friction-clutch upon said second shaft, a lever operating said friction-clutch, a rack-and-gear connection between said friction-clutch and said sliding carriage whereby said carriage is advanced to the work by the operation of said clutch, a bell-crank lever pivotally mounted, a connection between the upper end of said bell-crank lever and said sliding carriage, and a weight attached to the lower end of said bell-crank lever, the gravity of said weight operating to withdraw said carriage from the work when the clutch is released, substantially as specified.

5. In a dowel-hole-boring machine, a driving-shaft, a tool-holding carriage mounted to slide in a plane parallel with the driving-shaft, a second shaft mounted transversely of the driving-shaft, a worm upon the driving-shaft, a worm-gear upon the second shaft engaging said worm, a friction-clutch upon said second shaft, a lever operating said friction-clutch, a rack-and-gear connection between said friction-clutch and said sliding carriage whereby said carriage is advanced to the work by the operation of said clutch, an adjustable stop carried by said carriage to reverse said lever and thereby release said clutch, a bell-crank lever pivotally mounted, a connection between the upper end of said bell-crank lever and said sliding carriage, and a weight attached to the lower end of said bell-crank lever, the gravity of said weight operating to withdraw the carriage from the work when the clutch is released, substantially as specified.

6. In a dowel-hole-boring machine, a driving-shaft, two tool-holding carriages mounted to slide in a plane parallel with the driving-shaft, a projection upon one of said sliding carriages and engaging the other one of said carriages whereby the second carriage is operated by the operation of the first carriage and whereby the second carriage is allowed to operate independently of the first carriage, a second shaft mounted transversely of the driving-shaft, a worm upon the driving-shaft, a worm-gear upon the second shaft engaging said worm, friction-clutches upon said second shaft, one for each carriage, levers operating said friction-clutches, rack-and-gear connections between said friction-clutches and said carriages whereby the carriages are advanced to the work by the operation of the clutches, the operation of one clutch controlling the said second carriage and the operation of the other clutch controlling both carriages simultaneously, adjustable stops carried by said carriages to reverse said levers and thereby release said clutches, bell-crank levers pivotally mounted, connections between the upper ends of said bell-crank levers and said carriages, and weights attached to the lower ends of said bell-crank levers to withdraw the carriages from the work when the clutches are released by the action of said stops, substantially as specified.

7. In a dowel-hole-boring machine, a suitable frame, a work-bench mounted for vertical adjustment relative to said frame, tool-holding carriages slidingly mounted upon said frame, the bow-shaped bracket 124 attached at its ends to said frame and extending over the tools, the arm 125 extending upwardly from the central portion of the bracket and having the series of apertures 126, the hand-lever 127 pivotally and adjustably attached to said arm, the work-holder 129 slidingly mounted upon said lever, and the spring 133 connecting the free end of the lever with the upper end of the arm, substantially as specified.

8. In a dowel-hole-boring machine, the plate 135, the bar 136 attached to the lower face of said plate, the work-bench 107 having the recess 108 in which said bar 136 operates, the flange 138 projecting upwardly from the forward edge of said plate 135, the flange 139 projecting upwardly from one end of said plate, the plate 140 attached to the front face of said flange 138 and having a dovetail slot formed in its front face, the gage-stops 141 adjustably mounted in said slot, the block 146 attached to the work-bench and the leaf-spring 148 attached to said block and engaging said stops, 141, substantially as specified.

In testimony whereof I affix my signature in presence of two witnesses.

JOHN YERKES.

Witnesses:
A. J. McCAULEY,
EDWARD E. LONGAN.